(12) United States Patent
Tokgoz et al.

(10) Patent No.: US 11,044,756 B2
(45) Date of Patent: Jun. 22, 2021

(54) SUPPLEMENTARY UPLINK RANDOM ACCESS CHANNEL PROCEDURES

(71) Applicant: QUALCOMM Incorporated, San Diego, CA (US)

(72) Inventors: Yeliz Tokgoz, San Diego, CA (US); Tingfang Ji, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 16/144,462

(22) Filed: Sep. 27, 2018

(65) Prior Publication Data

US 2019/0110319 A1 Apr. 11, 2019

Related U.S. Application Data

(60) Provisional application No. 62/569,979, filed on Oct. 9, 2017.

(51) Int. Cl.
*H04W 74/08* (2009.01)
*H04L 5/00* (2006.01)
(Continued)

(52) U.S. Cl.
CPC ...... *H04W 74/0833* (2013.01); *H04B 7/0408* (2013.01); *H04L 5/005* (2013.01);
(Continued)

(58) Field of Classification Search
None
See application file for complete search history.

(56) References Cited

U.S. PATENT DOCUMENTS 9,113,381 B2 8/2015 Jung et al.
2014/0105136 A1 4/2014 Tellado et al.
(Continued)

FOREIGN PATENT DOCUMENTS

WO 2014079310 A1 5/2014
WO 2018008918 A1 1/2018
(Continued)

OTHER PUBLICATIONS

China Telecom: "Discussion on Remaining Issues of NR-LTE Co-existence", 3GPP Draft; R1-1716454, 3rd generation Partnership Project (3GPP), Mobile Competence Centre ; 650, Route Des Lucioles; F-06921 Sophia-Antipolis Cedex; France vol. RAN WG1. No. Nagoya. Japan; Sep. 18, 2017-Sep. 21, 2017 Sep. 12, 2017, (Year: 2017).*

(Continued)

*Primary Examiner* — Ayaz R Sheikh
*Assistant Examiner* — Faiyazkhan Ghafoerkhan

(57) ABSTRACT

Certain aspects of the present disclosure provide techniques for ordering a plurality of potential base stations to serve a user equipment on a supplemental uplink and providing random access channel (RACH) configuration parameters for each of the plurality of potential base stations to the user equipment. Certain aspects provide a method for wireless communication. The method generally includes communicating, by a user equipment (UE), with a first base station (BS) on a downlink on a first frequency band. The method further includes receiving, by the UE from the first BS, a list comprising RACH configuration parameters for each of a plurality of BSs. The method further includes selecting a second BS from the plurality of BSs based on an ordering of the plurality of BSs in the list and performing a RACH procedure with the second BS.

28 Claims, 9 Drawing Sheets

(51) Int. Cl.
*H04W 72/04* (2009.01)
*H04B 7/0408* (2017.01)
*H04W 74/00* (2009.01)
*H04W 88/06* (2009.01)
*H04B 7/06* (2006.01)

(52) U.S. Cl.
CPC ....... *H04L 5/0053* (2013.01); *H04W 72/0453* (2013.01); *H04W 74/008* (2013.01); *H04B 7/0695* (2013.01); *H04W 88/06* (2013.01)

(56) References Cited

U.S. PATENT DOCUMENTS

| | | | |
|---|---|---|---|
| 2017/0339621 A1 | 11/2017 | Wang et al. | |
| 2018/0115363 A1 | 4/2018 | Abedini et al. | |
| 2018/0131499 A1 | 5/2018 | Zhang et al. | |
| 2018/0132278 A1 | 5/2018 | Oteri et al. | |
| 2018/0324678 A1* | 11/2018 | Chen | H04W 8/08 |
| 2019/0053129 A1* | 2/2019 | Kim | H04W 52/38 |
| 2019/0082451 A1* | 3/2019 | Yun | H04W 74/0833 |
| 2019/0104552 A1* | 4/2019 | Hui | H04W 48/10 |
| 2019/0149379 A1* | 5/2019 | Xiong | H04L 5/006 370/329 |
| 2019/0150190 A1* | 5/2019 | Kim | H04W 74/006 370/329 |
| 2019/0215863 A1* | 7/2019 | Kim | H04W 36/0044 |
| 2019/0254064 A1* | 8/2019 | Islam | H04B 7/0695 |
| 2019/0268114 A1* | 8/2019 | Kang | H04W 72/04 |
| 2019/0273644 A1* | 9/2019 | Xiong | H04L 5/0025 |
| 2019/0274172 A1* | 9/2019 | Yoon | H04W 74/0866 |
| 2019/0281624 A1* | 9/2019 | Kim | H04L 27/26 |
| 2019/0306832 A1* | 10/2019 | Si | H04L 27/2666 |
| 2019/0320467 A1* | 10/2019 | Freda | H04W 74/0833 |
| 2019/0357185 A1* | 11/2019 | Kwak | H04L 1/0072 |
| 2019/0357264 A1* | 11/2019 | Yl | H04L 5/001 |
| 2019/0364603 A1* | 11/2019 | Qian | H04J 13/0062 |
| 2020/0022179 A1* | 1/2020 | Liu | H04W 72/1205 |
| 2020/0037345 A1* | 1/2020 | Ryoo | H04W 76/27 |
| 2020/0045761 A1* | 2/2020 | Zeng | H04W 72/0453 |
| 2020/0053785 A1* | 2/2020 | Kim | H04L 27/26 |
| 2020/0053786 A1* | 2/2020 | Kim | H04W 56/00 |
| 2020/0068549 A1* | 2/2020 | Kang | H04B 7/0695 |
| 2020/0084682 A1* | 3/2020 | Wang | H04W 28/18 |
| 2020/0092916 A1* | 3/2020 | Lee | H04W 74/006 |
| 2020/0107348 A1* | 4/2020 | Park | H04W 56/0045 |

FOREIGN PATENT DOCUMENTS

| | | | |
|---|---|---|---|
| WO | 2018062957 A1 | 4/2018 | |
| WO | 2018082580 A1 | 5/2018 | |

OTHER PUBLICATIONS

Huawei, et al., "Initial Access and Uplink Operations with SUL," 3GPP Draft; R1-1712165, 3rd Generation Partnership 3roject (3GPP), Mobile Competence Centre; 650, Route Des Lucioles; F-06921 Sophia-Antipolis Cedex; France, vol. RAN (Year: 2017).*

CMCC: "Considerations on Support of Supplementary Uplink Frequency," 3GPP Draft; R2-1709093-SUL, 3GPP, Mobile Competence Centre; 650, Route Des Lucioles; F-06921 Sophia-Antipolis Dedex; France, vol. RAN WG2, No. Berlin, Germany; Aug. 21, 2017-Aug. 25, 2017, Aug. 20, 2017, XP051318885, 4 Pages (Year: 2017).*

China Telecom: "Discussion on Remaining Issues of NR-LTE Co-existence", 3GPP Draft; R1-1716454, 3rd Generation Partnership Project (3GPP), Mobile Competence Centre ; 650, Route Des Lucioles ; F-06921 Sophia-antipolis Cedex ; France vol. RAN WG1. No. Nagoya. Japan; Sep. 18, 2017-Sep. 21, 2017 Sep. 12, 2017, XP051330041, Retrieved from the Internet: URL:http://www.3gpp.org/ftp/tsg_ran/WG1_RL1/TSGR1_AH/NR_AH_1709/Docs/ [retrieved on—Sep. 12, 2017], 6 pages.

CMCC: "Considerations on Support of Supplementary Uplink Frequency," 3GPP Draft; R2-1709093-SUL, 3rd Generation Partnership (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017, Aug. 20, 2017, XP051318885, 4 pages, Retrieved from the Internet: URL: http://www.3gpp.org/ftp/Meetings_3GPP_SYNC/RAN2/Docs/ [retrieved on Aug. 20, 2017].

Huawei, et al., "Initial Access and Uplink Operations with SUL," 3GPP Draft; R1-1712165, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017; Aug. 20, 2017, XP051314984, 6 pages, Retrieved rom the Internet: URL: http://www.3gpp.org/ftp/Meetings_3GPP_SYNC/RAN1/Docs/ [retrieved on Aug. 20, 2017].

International Search Report and Written Opinion—PCT/US2018/053394—ISA/EPO—dated Dec. 5, 2018.

NTT Docomo, et al., "Remaining Issues on Single UL Transmission," 3GPP Draft; R1-1716113 Single UL TX, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339571, 4 pages, Retrieved from the Internet: URL: http://www.3gpp.org/ftp/Meetings_3GPP_SYNC/RAN1/Docs/ [retrieved on Sep. 17, 2017].

* cited by examiner

SUPPLEMENTARY UPLINK RANDOM ACCESS CHANNEL PROCEDURES

CROSS-REFERENCE TO RELATED APPLICATIONS

This application claims the benefit of U.S. Provisional Patent No. 62/569,979, filed Oct. 9, 2017. The content of the provisional application is hereby incorporated by reference in its entirety.

INTRODUCTION

Aspects of the present disclosure relate to wireless communications, and more particularly, to techniques for performing random access channel procedures by a user equipment to establish a connection with a base station to communicate on an uplink.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes communicating, by a user equipment (UE), with a first base station (BS) on a downlink on a first frequency band. The method further includes receiving, by the UE from the first BS, a list comprising random access channel (RACH) configuration parameters for each of a plurality of BSs. The method further includes selecting a second BS from the plurality of BSs based on an ordering of the plurality of BSs in the list. The method further includes performing a RACH procedure with the second BS utilizing the RACH configuration parameters for the second BS to establish communication with the second BS on an uplink on a second frequency band that is different than the first frequency band.

Certain aspects provide a user equipment (UE) including a memory and a processor coupled to the memory. The processor is configured to communicate with a first base station (BS) on a downlink on a first frequency band. The processor is further configured to receive, from the first BS, a list comprising random access channel (RACH) configuration parameters for each of a plurality of BSs. The processor is further configured to select a second BS from the plurality of BSs based on an ordering of the plurality of BSs in the list. The processor is further configured to perform a RACH procedure with the second BS utilizing the RACH configuration parameters for the second BS to establish communication with the second BS on an uplink on a second frequency band that is different than the first frequency band.

Certain aspects provide a user equipment (UE). The UE includes means for communicating with a first base station (BS) on a downlink on a first frequency band. The UE further includes means for receiving, from the first BS, a list comprising random access channel (RACH) configuration parameters for each of a plurality of BSs. The UE further includes means for selecting a second BS from the plurality of BSs based on an ordering of the plurality of BSs in the list. The UE further includes means for performing a RACH procedure with the second BS utilizing the RACH configuration parameters for the second BS to establish communication with the second BS on an uplink on a second frequency band that is different than the first frequency band.

Certain aspects provide a non-transitory computer readable storage medium that stores instructions that when executed by a user equipment (UE) causes the UE to perform a method for wireless communication. The method generally includes communicating, by a user equipment (UE), with a first base station (BS) on a downlink on a first frequency band. The method further includes receiving, by the UE from the first BS, a list comprising random access channel (RACH) configuration parameters for each of a plurality of BSs. The method further includes selecting a second BS from the plurality of BSs based on an ordering of the plurality of BSs in the list. The method further includes performing a RACH procedure with the second BS utilizing the RACH configuration parameters for the second BS to establish communication with the second BS on an uplink on a second frequency band that is different than the first frequency band.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
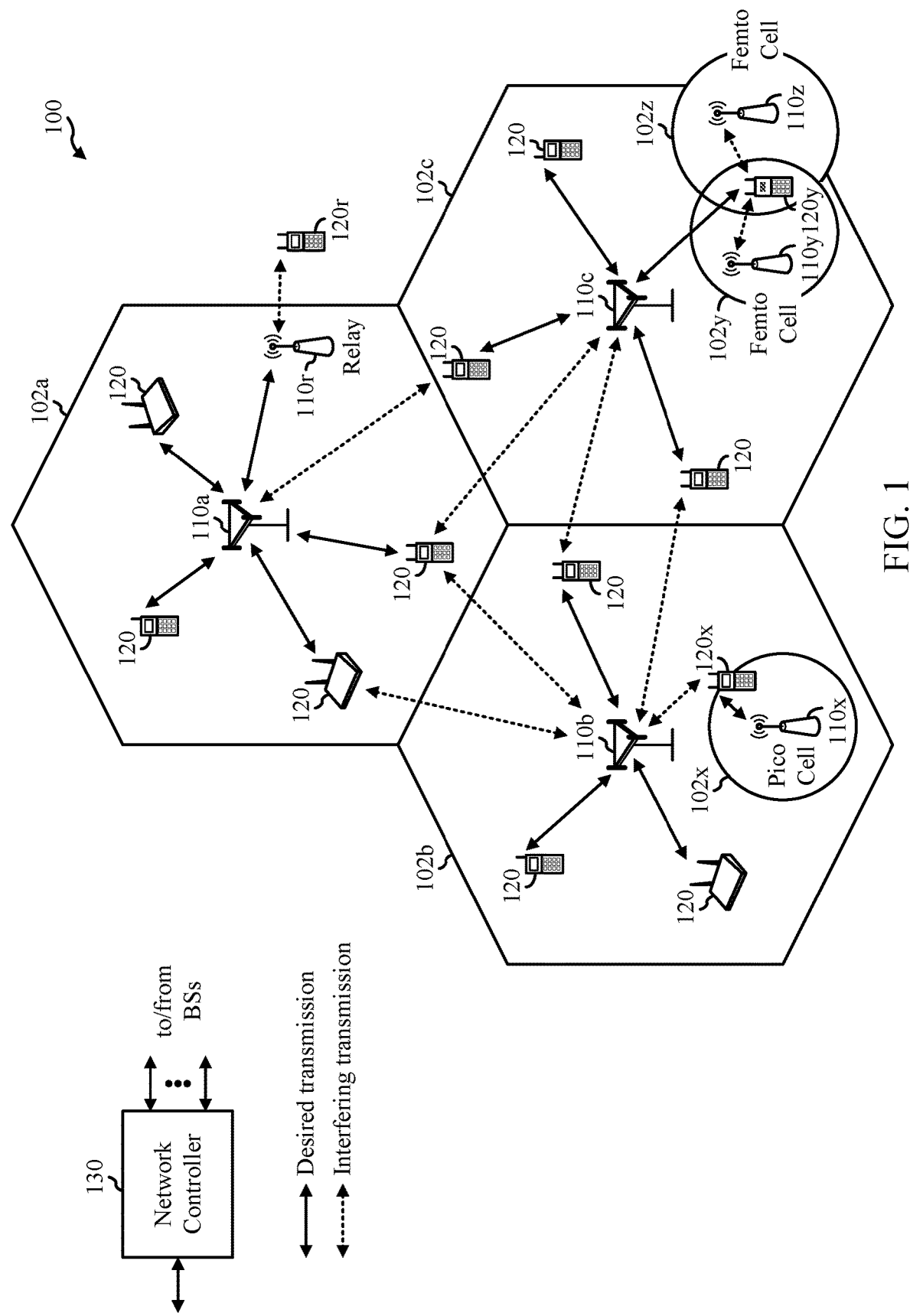
FIG. 1 is a block diagram conceptually illustrating an example telecommunications system, in accordance with certain aspects of the present disclosure.

Aspects of the present disclosure provide apparatus, methods, processing systems, and computer readable mediums for supplementary uplink (SUL) random access channel (RACH) procedures.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. NR wireless communication systems may employ short uplink bursts. As described herein, for example, with respect to FIG. 8, a UE performs uplink signal processing, for example, for the short uplink burst including reference signals and data. UEs 120 may be configured to perform the operations 800 and methods described herein for uplink signal processing. The BS 110 may perform complementary operations to the operations 800 by the UE 120.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
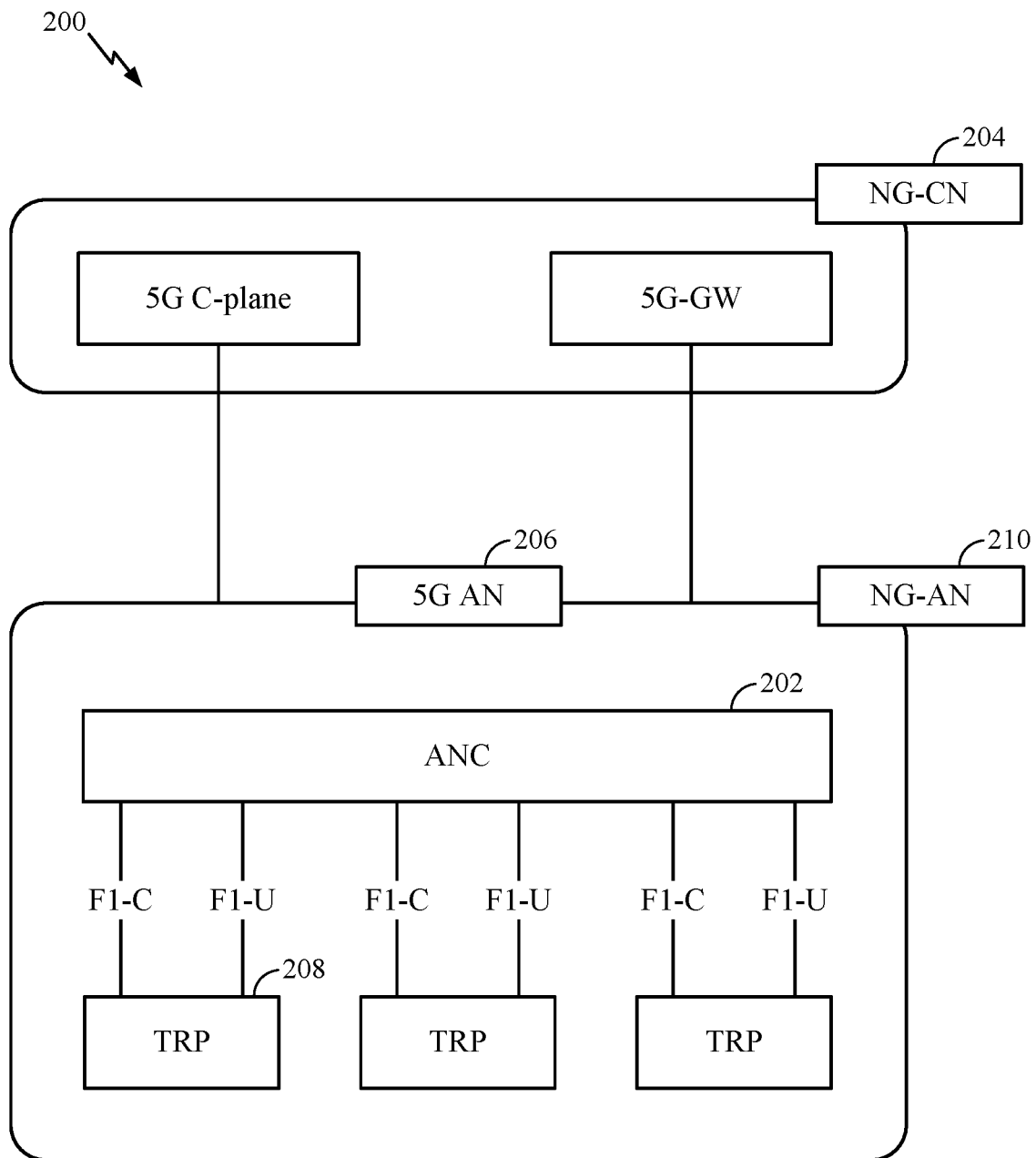
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
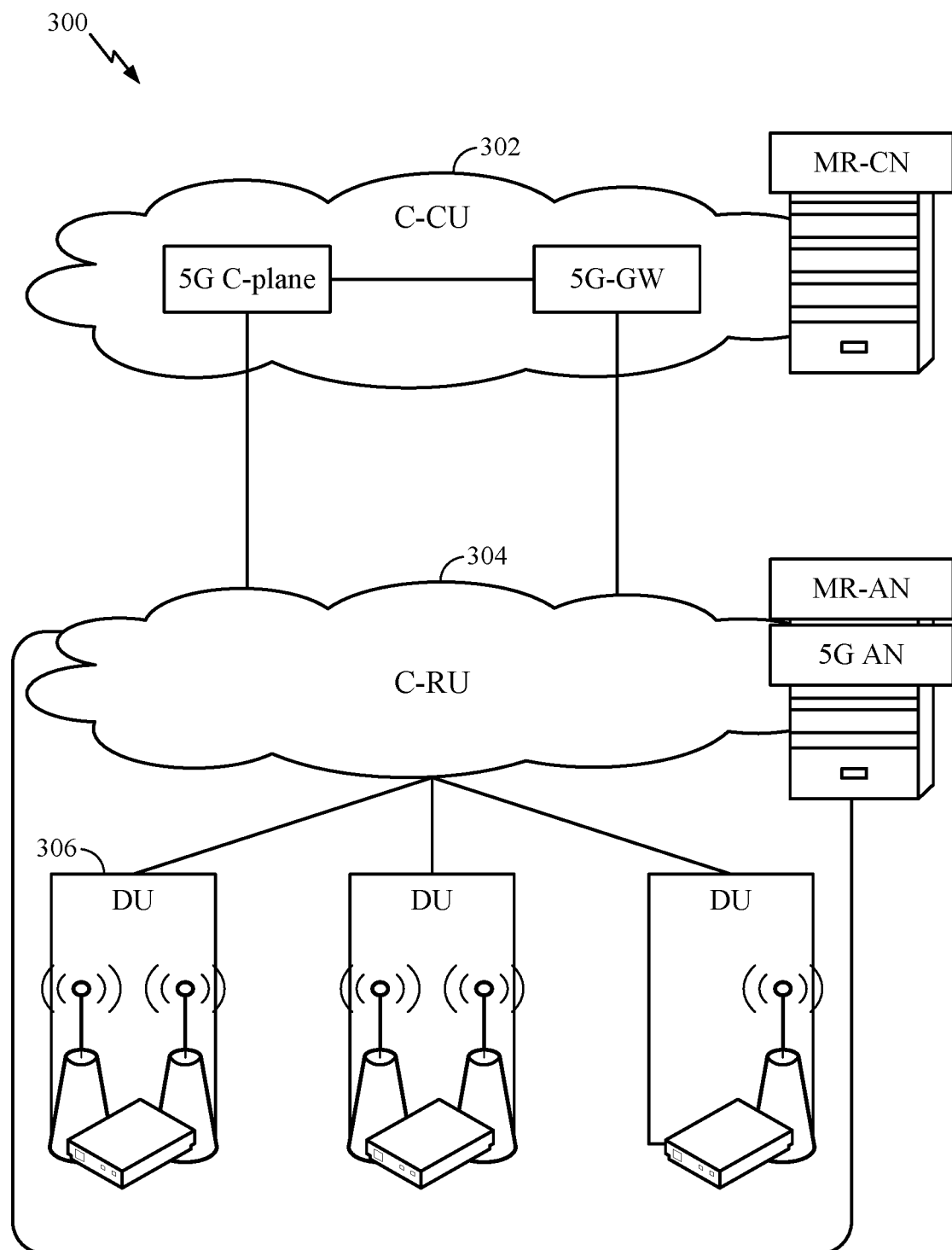
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
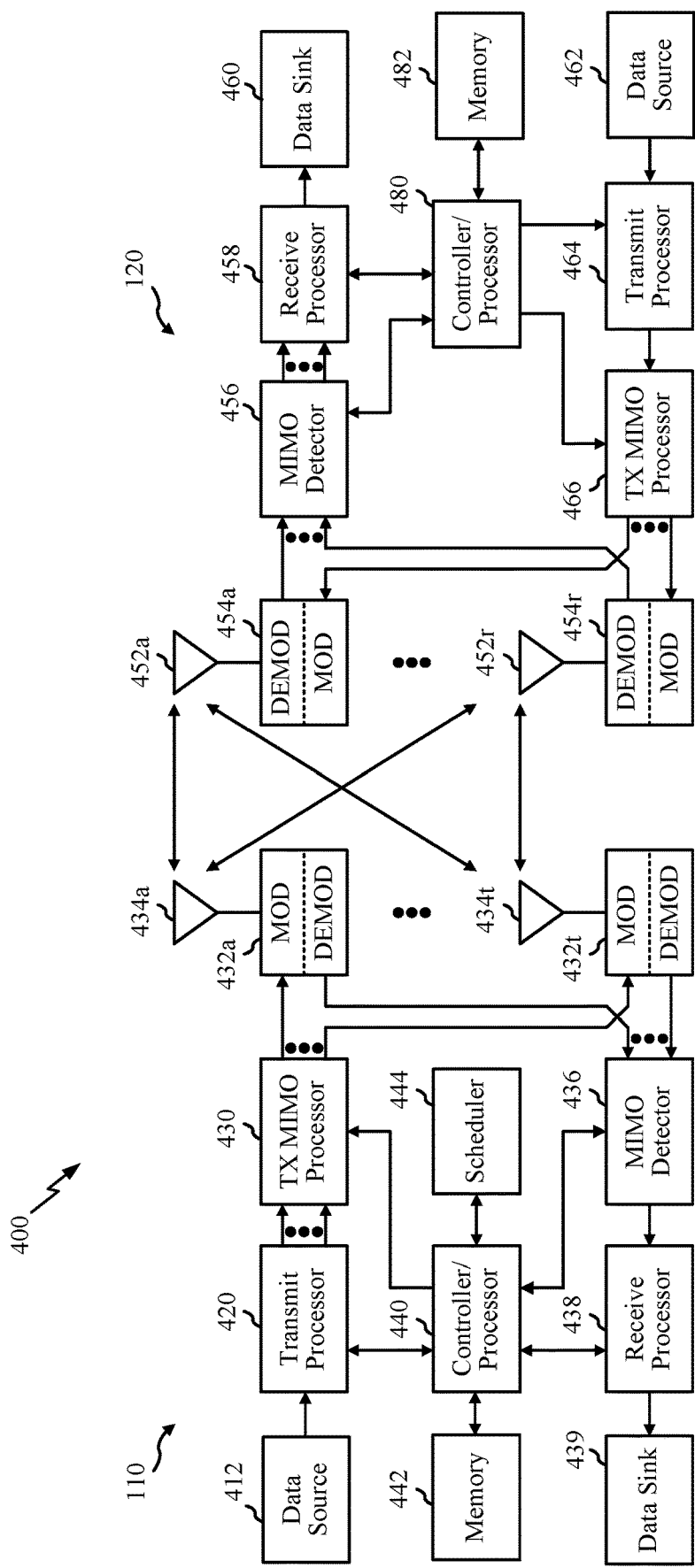
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein, such as operations 800 of FIG. 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
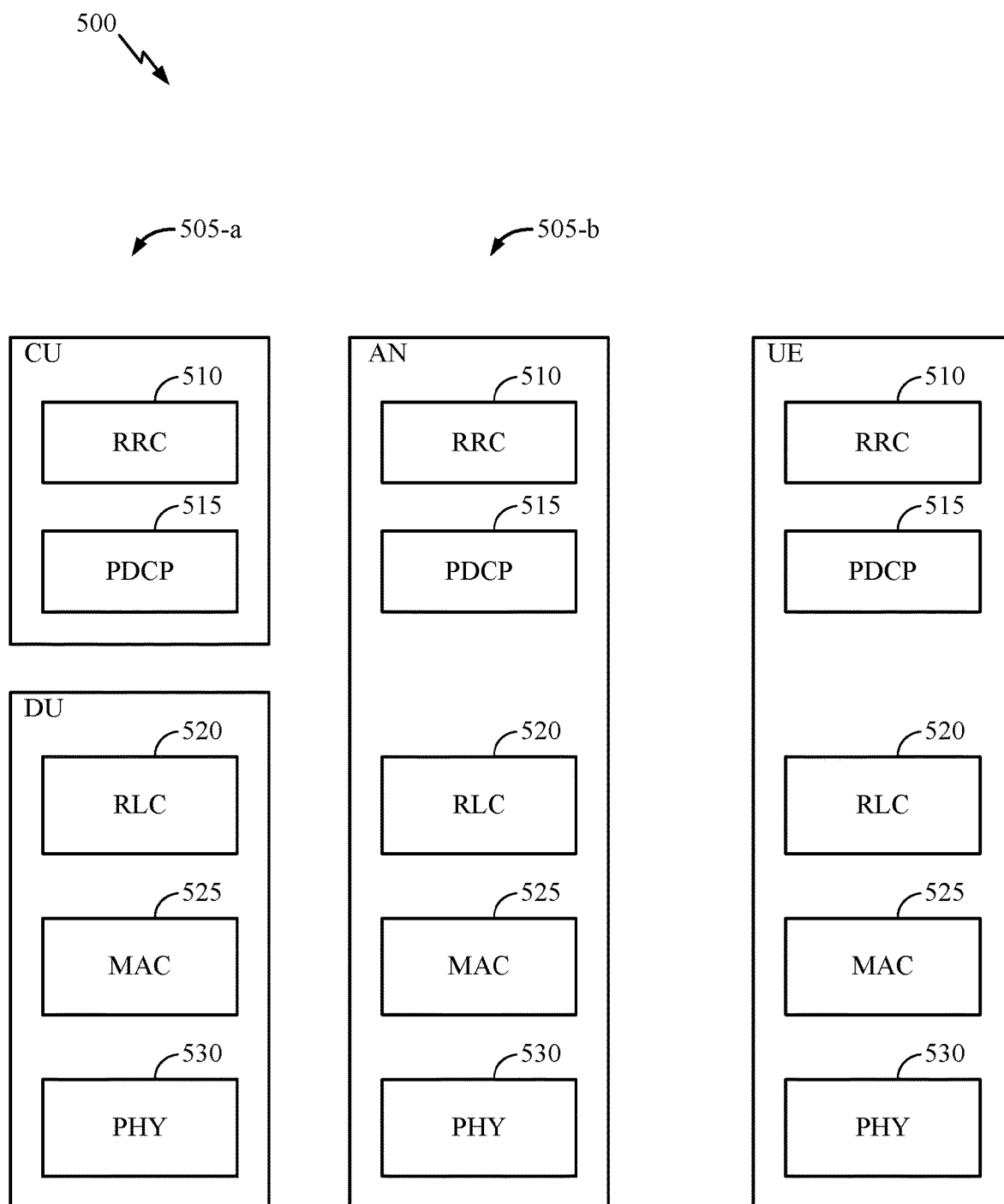
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
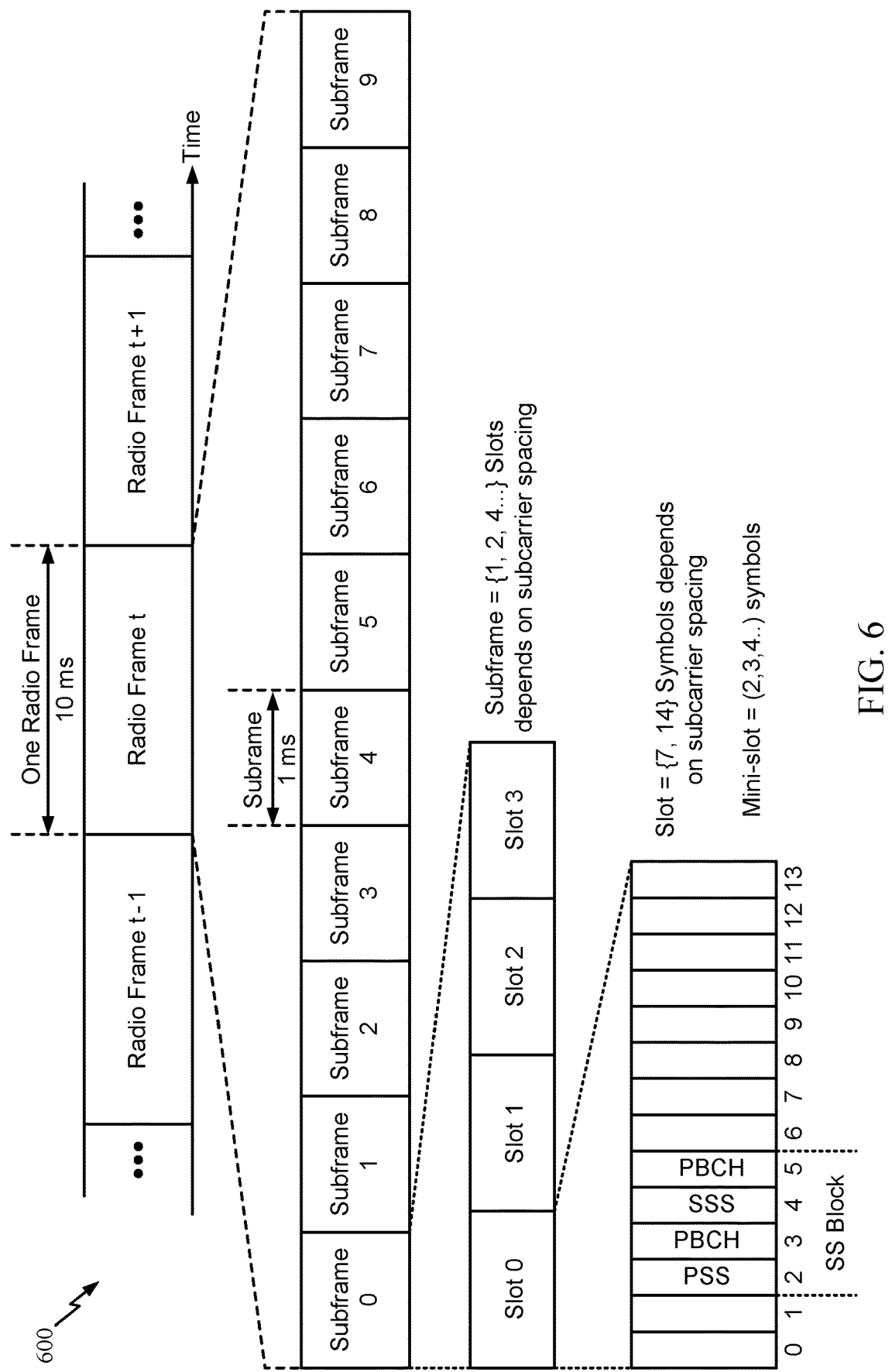
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 2-5 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Supplementary Uplink (SUL) RACH Procedures

As discussed, a UE 120 may communicate in a network 100 via a BS 110 that serves the UE 120. In certain aspects, the UE 120 and BS 110 may communicate over a high frequency band (e.g., using mmW). Use of such high frequency bands for communication may lead to link budget limitations (e.g., especially on the UL) meaning that the distance over which the BS 110 and UE 120 can successfully communicate is limited (e.g., the coverage area using such high frequency bands may be smaller than the coverage area using lower frequency bands). For example, use of high frequency bands for communication may lead to larger propagation losses for signals communicated between UE 120 and BS 110 as compared to use of low frequency bands for communication. Such larger propagation losses may mean that the signal quality deteriorates more quickly with respect to distance using high frequency bands as compared to low frequency bands for communication. Further, the UE 120 may have transmit power restrictions for communicating on the UL with BS 110 (e.g., due to electromagnetic field (EMF) exposure limitations) and therefore cannot increase transmit power beyond a certain level to compensate for the increased propagation losses.

In certain aspects, to enhance performance of UL communications by the UE 120 in network 100, in addition to or instead of using the high frequency band for communication on the UL with a BS 110 that serves the UE 120 on the DL, the UE 120 may use a low frequency band for communication on the UL with the same BS 110 that serves UE 120 on the DL and/or a different BS. Such a UL on the low frequency band may be supplemental to the UL on the high frequency band and referred to as a supplementary UL (SUL).

Figure 7:
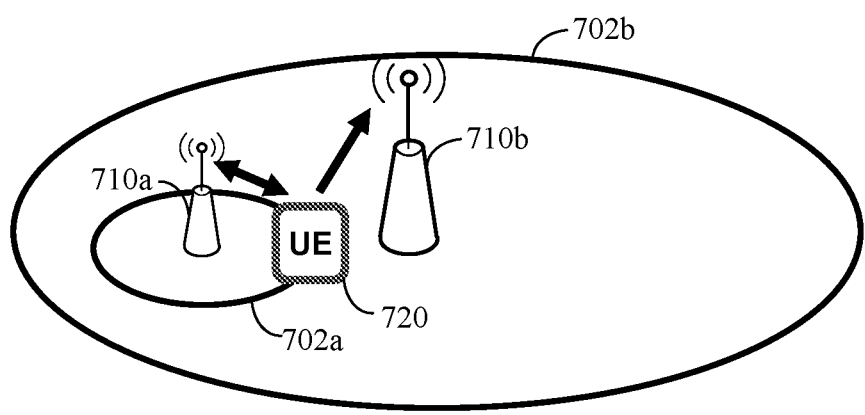
FIG. 7 is a block diagram conceptually illustrating an example telecommunications system, in accordance with certain aspects of the present disclosure.

FIG. 7 is a block diagram conceptually illustrating an example telecommunications system, in accordance with certain aspects of the present disclosure. As shown, BS 710a (e.g., a BS 110) may communicate using one or more high frequency bands and serve a cell 702a by providing DL and UL coverage for UEs in the cell 702a. UE 720 (e.g., a UE 120) may be served by BS 710a in cell 702a. For example, UE 720 may establish a connection (e.g., using a RRC configuration) with BS 710a for communicating with BS 710a on the DL (and potentially also the UL). Depending on the location of UE 720 in cell 702a, the UL channel quality between UE 120 and BS 710a may differ. For example, if the UE 720 is closer to BS 710a (e.g., far from the cell edge of cell 702a) the UL channel quality may be sufficient for UE 720 to efficiently communication on the UL with BS 710a using the one or more high frequency bands. However, if the UE 720 is farther from BS 710a (e.g., close to the cell edge of cell 702a) the UL channel quality may suffer and UE 720 may not be able to efficiently communicate on the UL with BS 710a.

Accordingly, UE 720 may instead or in addition communicate over one or more low frequency bands on a SUL with BS 710a or another BS. In FIG. 7, UE 720 may communicate with BS 710b using one or more low frequency bands. For example, BS 710b may serve a cell 702b using one or more low frequency bands by providing UL coverage (e.g., and also optionally DL coverage) for UEs in the cell 702b. The UE 720 may establish a connection with BS 710b to communicate on a SUL. Since communications on the SUL are using a low frequency band, even if the UE 720 is further from BS 710b than BS 710a, the channel quality on the SUL may be better than the channel quality on the UL between UE 720 and BS 710a. Accordingly, a UE 720 may have different serving cells (e.g., from different BSs) for communicating on the UL and DL.

In certain aspects, if the high frequency band UL from BS 710a is not available to UE 720 (e.g., due to poor UL channel quality), the UE 720 should be able to access the network utilizing a low frequency band on the UL as discussed. Such access by the UE 720 includes both initial access by UE 720 to the network on the UL, as well as access due to a handover.

Conventionally, for a UE to establish a connection with a BS (e.g., for initial access, or as a handover target) in a network, the UE may monitor DL transmission signals from one or more BSs. The UE may measure the DL transmission signals from each of the one or more BSs and determine which of the one or more BSs to attempt to establish a connection with based on the measurements. For example, the UE may measure the DL transmission signals from each of the one or more BSs and determine a signal strength (e.g., RSSI, RSRP, RSRQ) of each of the DL transmission signals. The UE may select the BS with the DL transmission signal with the highest measured signal strength to connect to. In order to connect to the BS, the UE may initiate a RACH procedure to connect to the BS. In particular, the UE may perform the RACH procedure based on RACH configuration parameters associated with the BS. For example, each BS may have specific RACH configuration parameters (e.g., a number of preambles available for a condition (e.g., in a cell, for attachment, for handover, etc.), a configuration index, a frequency offset, a power factor, a power ramping step, a resource indication, a target received power level, a maximum number of preamble transmission, etc.), and the UE may need the RACH configuration parameters specific to a BS to perform a RACH procedure with the BS.

In certain aspects, to establish a SUL with a BS (e.g., BS 710b), a UE (e.g., UE 720) is configured to receive the RACH configuration parameters for the BS 710b from the DL serving BS (e.g., BS 710a) of the UE 720. For example, the BS 710a may be configured to broadcast on the DL (e.g., in a remaining minimum system information (RMSI)) the RACH configuration parameters for establishing a SUL with a BS near the BS 710a, such as with BS 710b. Accordingly, UEs connected to BS 710a and being served on the DL by BS 710a may receive the RACH configuration parameters for one BS to establish a SUL with the BS.

In certain aspects, the DL and SUL may be collocated, meaning the DL serving BS 710a and SUL serving BS (e.g., BS 710b) may be located in substantially the same area geographically, or the DL serving BS and SUL serving BS may even be the same physical BS. In such aspects, the DL serving BS and SUL serving BS may be tied together in the sense that if a UE uses a given DL serving BS for communicating on the DL, the UE may use the associated SUL serving BS for communication on the SUL. In this case, the BS 710a providing RACH configuration parameters for the single SUL serving BS may be sufficient, as if the UE 720 is served on the DL by BS 710a, the SUL may always be established with the same SUL serving BS.

However, such techniques, may not work where the DL and SUL are not necessarily collocated. For example, the UE may be in the coverage area of the same DL serving BS (i.e., the BS that provides DL coverage to the UE), but there may be multiple potential SUL serving BSs (i.e., BSs that can provide SUL coverage to the UE) that have overlapping SUL coverage areas with the DL coverage area of the DL serving BS. Therefore, the BS that the UE can use for the SUL may depend on the location of the UE even within the coverage area of the DL serving BS. Therefore, the DL serving BS providing to the UE RACH configuration parameters for only a single SUL serving BS may not be sufficient. Accordingly, in certain aspects, the DL serving BS is configured to provide to the UE (e.g., in a broadcast message such as in a RMSI) RACH configuration parameters for multiple potential SUL serving BSs (e.g., along with identifiers of the multiple potential SUL serving BSs). The RACH configuration parameters for multiple potential SUL serving BSs may be referred to as a RACH list. The UE may use the RACH list and measurements of DL transmissions from the multiple potential SUL serving BSs to determine which BS to pick to serve the UE on the SUL and RACH to the selected BS accordingly using the corresponding RACH configuration parameters from the RACH list. In certain aspects, the DL serving BS may receive the RACH configuration parameters for another BS over the backhaul by requesting the RACH configuration parameters from the BS.

In certain aspects, the DL serving BS (e.g., BS 710a) is configured to identify each potential SUL serving BS (e.g., a BS 710b) in the vicinity of the BS 710a that is likely to be used by UEs served by the BS 710a for communication on the SUL. In certain aspects, the potential SUL serving BSs for a given DL serving BS are configured by the network, such as based on deployment topology. For example, BS 710a may be configured by the network to include a particular set of SUL serving BSs in the RACH list.

In certain aspects, the BS 710a may itself identify (e.g., over time) the SUL serving BSs in its vicinity. For example, the UEs 720 served by the BS 710a may monitor for and measure DL transmission signals from BSs (e.g., in one or more frequency bands) that the BSs use to transmit to the UEs they serve on the DL. The UEs 720 may then report the results of the measurement of DL transmission signals from the BSs to the BS 710a. If the DL transmission signals from a BS meet a certain threshold (e.g., signal strength) the BS 710a may include the BS as a SUL serving BS in the RACH list.

In certain aspects, each UE 720 may monitor one or more frequency band(s), such as measuring the received signal strength of DL transmissions from one or more other BSs. The UE 720, based on the transmit power(s) of the one or more other BSs and the measured signal strength of the one or more other BSs may estimate the path loss between the UE 720 and each of the one or more other BSs. The UE 720 may then send a measurement report including the estimated path loss for each of the one or more other BSs to the BS 710a, and the BS 710a may include BSs as a SUL serving BS in the RACH list if the estimated path loss for the BS meets a threshold. In other aspects, UE 720 may be configured to determine if the estimated path loss for each BS meets a threshold itself based on the measurements and instead transmit to BS 710a an indication of suitable BSs to add to the RACH list.

In certain aspects, once the UE 720 has the RACH list, it may prioritize or order the RACH list to determine in what order to attempt RACH for the different potential SUL serving BSs in the RACH list. For example, the UE 720 may order the RACH list and then in order attempt to RACH and establish a SUL with the potential SUL serving BSs one at a time until a SUL is established with one of the BSs. By picking the best potential SUL serving BS to RACH, the UE 720 may reduce latency in establishing the SUL such as due to better signal conditions.

In certain aspects, each of the potential SUL serving BSs may be configured to communicate on a DL with other UEs (e.g., in the same frequency band and/or different frequency bands). For example, BS 710*b* may be configured to communicate with UEs in cell 702*b* on the DL and UL. The BS 710*b* may be configured to use a different frequency band for communication on the DL and/or UL with UEs in cell 702*b* than it uses for the SUL for communicating with UE 720. For example, the BS 710*b* may utilize a mid frequency band (e.g., in between the low frequency band used for the SUL of BS 710*b* and the high frequency band used for the DL of BS 710*a*). In certain aspects, the frequency band used for communication on the DL by BS 710*b* is different than the frequency band used for communication on the DL by BS 710*a*.

In certain aspects, the UE 720 may be configured (e.g., by BS 710*a* as part of a RRC reconfiguration) to monitor DL transmissions (e.g., in the one or more frequency bands) from one or more potential SUL serving BSs (e.g., BS 710*b*) indicated in the RACH list to help determine an order of the RACH list. The UE 720 may then monitor the frequency band(s) used by the one or more potential SUL serving BSs for transmission on the DL(s), such as measuring the received signal strength of DL transmissions from the one or more potential SUL serving BSs. The UE 720, based on the measured signal strength of the one or more potential SUL serving BSs may order the potential SUL serving BSs (e.g., from a highest signal strength to a lowest signal strength).

In certain aspects, the DL serving BS (e.g., BS 710*a*) for UE 720 may configure UE 720 (e.g., as part of a RRC reconfiguration) to monitor the frequency band(s) used by one or more potential SUL serving BSs. BS 710*a* may configure UE 720 to monitor the frequency band(s) using dedicated signaling (e.g., a unicast or multicast message) to configure one or more specific UEs 720, or common signaling (e.g., a broadcast message) to configure all UEs 720 served by the BS 710*a* on the DL. If the one or more potential SUL serving BSs communicate using a different RAT than the BS 710*a*, the BS 710*a* may also include (in the same or different signaling/message) an indication of the RAT(s) to use for monitoring the frequency band(s). The BS 710*a* may also include (in the same or different signaling/message) an indication of the transmit power(s) the DL transmissions are sent by the one or more potential SUL serving BSs (e.g., as transmit power(s) associated with identifiers of the one or more other potential BSs 710). The BS 710*a* may also include (in the same or different signaling/message) an indication of the path loss offset between the DL transmission band of potential SUL serving BSs and the UL transmission band used for SUL. The BS 710*a* may receive the information to send to the UE 720 about the one or more potential SUL serving BSs over a backhaul. In certain aspects, the UE 720, based on the transmit power(s) of the one or more potential SUL serving BSs and the measured signal strength of the one or more potential SUL serving BSs may estimate the path loss between the UE 720 and each of the one or more potential SUL serving BSs. The UE 720, based on the estimated path loss of the one or more potential SUL serving BSs may order the potential SUL serving BSs (e.g., from a lowest estimated path loss to a highest estimated path loss).

Though certain aspects are discussed with respect to potential SUL serving BSs using different frequency band(s), it should be noted that similarly the potential SUL serving BSs may use different RAT(s). Accordingly, information about RATs may in addition or alternatively be sent/received in the same manner as information about frequency bands. For example, the DL serving BS (e.g., BS 710*a*) for UE 720 may configure UE 720 (e.g., as part of a RRC reconfiguration) to monitor the frequency band(s) on certain RATs used by one or more potential SUL serving BSs. For example, UE 720 may receive, from the BS 710*a*, an indication of one or radio access technologies (RATs) for measuring the downlink transmissions of the potential SUL serving BSs.

In certain aspects, as discussed, the frequency band used by a BS 710 for communicating the SUL with UE 720 may be different than a frequency band used for DL transmissions by the BS 710. Accordingly, the path loss estimated by UE 720 based on the DL transmissions may differ from the actual path loss on the SUL with BS 710 due to different propagation characteristics for the different frequency bands. Therefore, the UE 720 may adjust the estimated path loss and/or ranking of BSs 710 by adjusting the estimated path loss for the BSs 710 based on the offset between the frequency bands. In certain aspects, the BS 710*a* may communicate an adjustment or offset for the UE 720 to apply to the path loss estimate for each of the one or more potential SUL serving BSs to account for the different bands as part of the configuration of the UE 720.

In certain aspects, UE 720 may be configured to periodically monitor the DL transmissions of other potential BSs 710. In some aspects, UE 720 may be configured to monitor the DL transmissions of other potential BSs 710 only when directed to by BS 710*a*. In some aspects, the UE 720 may adjust when or how often it monitors the DL transmissions such as based on the current UL channel conditions for the UE 720 (or even the DL conditions for the UE 720, which may be indicative of a distance of the UE 720 from BS 710*a*). For example, UE 720 may be configured to monitor DL transmission (or increase a frequency/periodicity with which it monitors DL transmissions) when there are problems on the UL, such as the UE 720 reaching its UL power headroom, having a large (e.g., threshold) number of HARQ requests on the UL (e.g., within a time period), etc.

In certain aspects, UE 720 may itself learn or determine (e.g., over time) RACH success rates (e.g., how often the UE 720 successfully performs RACH with a BS as compared to how often the UE 720 attempts to perform RACH with the BS) for potential SUL serving BSs in the RACH list. For example, when the UE 720 is connected to a particular BS 710*a* and receives a RACH list, it may maintain the RACH success rates for the potential SUL serving BSs in the RACH list. The UE 720 may then order the RACH list (e.g., used when connected to the particular BS 710*a*) from BSs with the highest success rate to BSs with the lowest success rate. In certain aspects, the ordering may be based on a combination of RACH success rate, signal strength, and/or estimated path loss for BSs.

In certain aspects, instead of or in combination with the ordering of the RACH list being performed by the UE, the ordering may be network based. For example, a DL serving BS 710*a* may be configured to order the RACH list for a UE 720 in the DL coverage area of the BS 710*a* based on the location (or approximate location) of the UE 720 in the DL coverage area. For example, depending on where the UE 720 is in the DL coverage area of the BS 710*a* it may be closer to particular potential SUL serving BSs than to other potential SUL serving BSs. Accordingly, the BS 710*a* may order the RACH list based on the distance between the UE 720 and each of the potential SUL serving BSs (e.g., from a smallest distance to a largest distance). The BS 710*a* may be configured by the network with information indicative of the locations (or approximate locations) of the potential SUL serving BSs in order to order the RACH list.

In certain aspects, BS 710*a* may request from UE 720 location information (e.g., GPS coordinates) of the UE 720 and the UE 720 may transmit the location information to the BS 710*a*. The BS 710*a* may then use such information to order the RACH list and send the ordered RACH list to UE 720 or a separate message indicating an ordering for the RACH list.

In certain aspects, BS 710*a* may be configured to utilize beamforming to spatially beamform and transmit signals as beams in different spatial directions. Each of the different beams may include an identifier of the beam. Accordingly, UEs 720 may receive one or more beams from BS 710*a* and measure the signal strength of the one or more beams and identify the signal strengths of the one or more beams. The one or more beams that are received by the UE 720 with the strongest signal strengths may change based on the location of the UE 720 and therefore are indicative of the location of the UE 720. Accordingly, the BS 710*a* may transmit (e.g., in a separate message or same message as the RACH list) to the UE 720 which potential SUL serving BSs are associated with which beams, and the UE 720 may then order the RACH list based on the strength of the beams associated with the potential SUL serving BSs (e.g., from the potential SUL serving BS associated with the beam with the highest signal strength to the potential SUL serving BS associated with the beam with the lowest signal strength). In certain aspects, the BS 710*a* may be configured to send a different ordered RACH list on each beam (e.g., ordered based on the locations of the potential SUL serving BSs with respect to the beam from closest to furthest), and the UE 720 uses the RACH list received with the highest signal strength.

In certain aspects, as discussed, UEs 720 may be configured to monitor DL transmissions of BSs and measure statistics (e.g., signal strength, path loss, etc.) of the BSs. The UEs 720 may report the measurements associated with the BSs to the DL serving BS 710*a*, and the DL serving BS 710*a* may order the RACH list based on the measurements over time from the UEs 720. The BS 710*a* may then use such information to order the RACH list and send the ordered RACH list to UE 720 or a separate message indicating an ordering for the RACH list.

In certain aspects, UE 720 served by BS 710*a* may also detect other DL serving BSs on the same high frequency band used for communication on the DL between UE 720 and BS 710*a*. The UE 720 may determine which other DL serving BSs it detects as neighbors and report this information to BS 710*a*. The DL serving BSs that UE 720 detects may be based on the location of the UE 720 (especially since the DL transmissions may have limited propagation distance) and therefore indicative of the location of the UE 720. The BS 710*a* may also be configured by the network with information indicative of the locations (or approximate locations) of the potential SUL serving BSs. Therefore, the BS 710*a* may order the RACH list based on which potential SUL serving BSs are closest to the DL serving BSs detected by the UE 720. The BS 710*a* may then use such information to order the RACH list and send the ordered RACH list to UE 720 or a separate message indicating an ordering for the RACH list.

Figure 8:
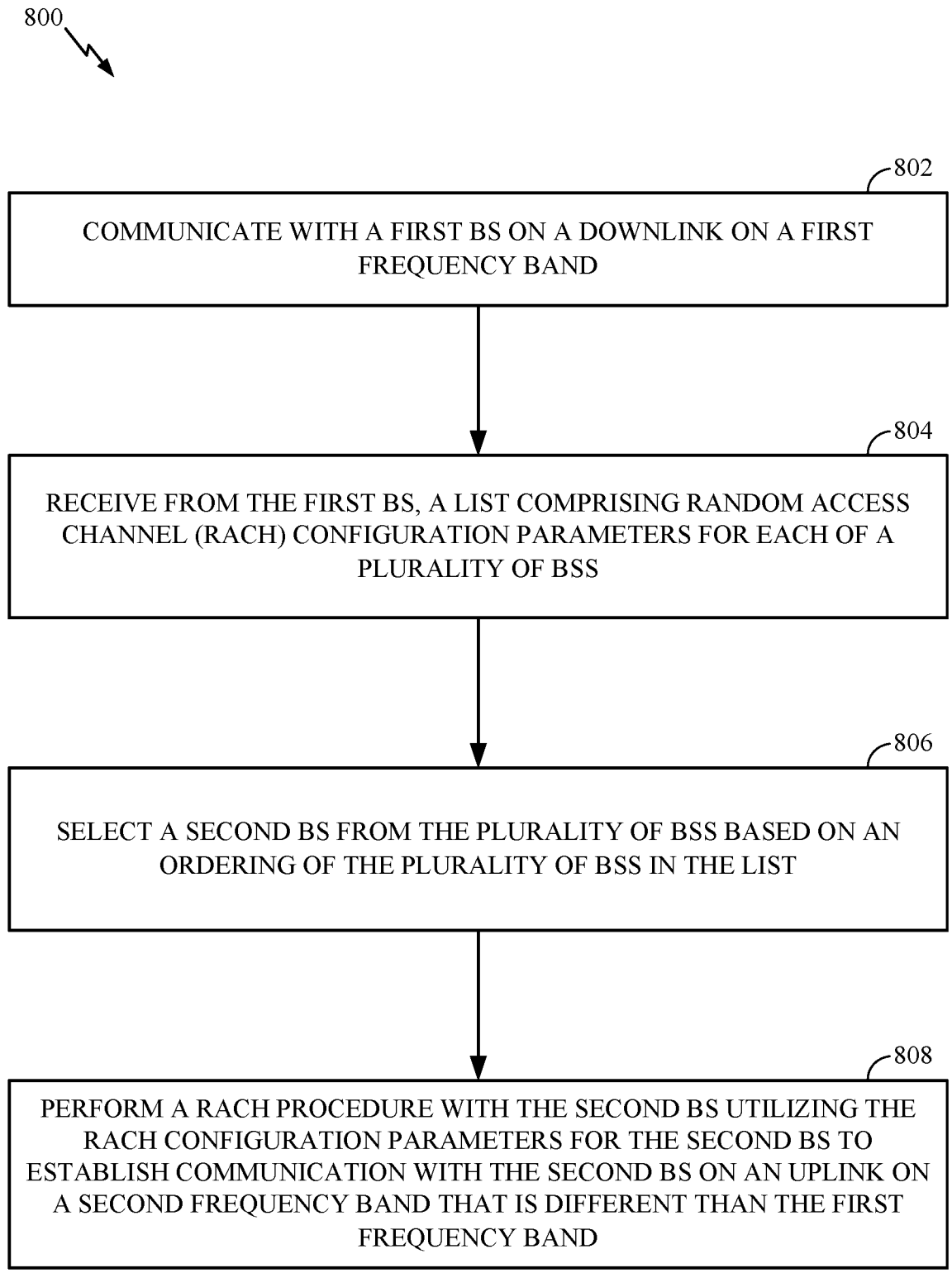
FIG. 8 illustrates example operations that may be performed by a wireless device such as a user equipment (UE) for performing a RACH procedure with a BS in accordance with aspects of the present disclosure.

FIG. 8 illustrates example operations 800 that may be performed by a wireless device such as a user equipment (UE) (e.g., UE 720) for performing a RACH procedure with a BS (e.g., BS 710) in accordance with aspects of the present disclosure.

Operations 800 begin, at 802, by a UE communicating with a first BS on a downlink on a first frequency band. At 804, the UE receives from the first BS, a list comprising random access channel (RACH) configuration parameters for each of a plurality of BSs. At 806, the UE selects a second BS from the plurality of BSs based on an ordering of the plurality of BSs in the list. At 808, the UE performs a RACH procedure with the second BS utilizing the RACH configuration parameters for the second BS to establish communication with the second BS on an uplink on a second frequency band that is different than the first frequency band.

Figure 9:
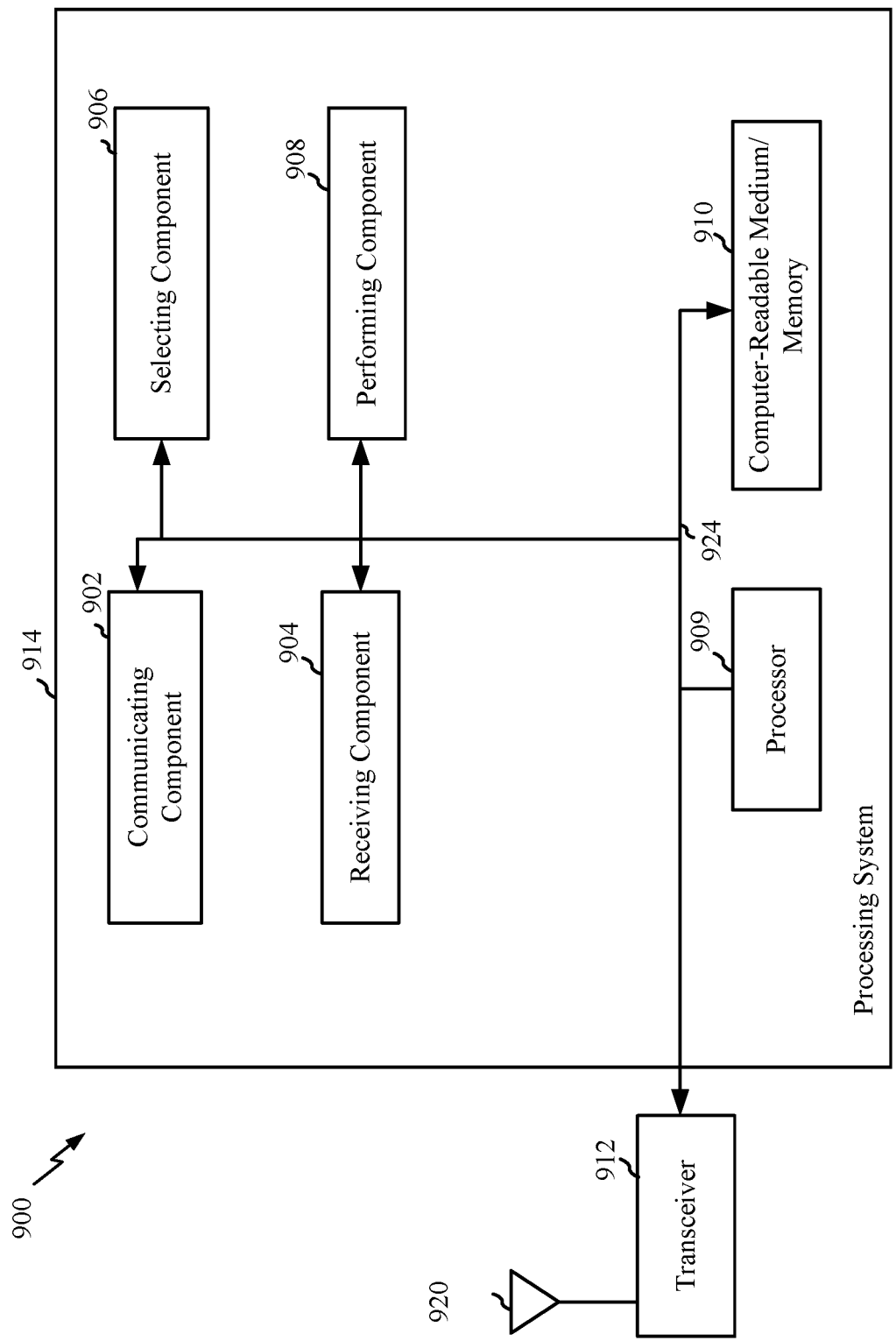
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 914 coupled to a transceiver 912. The transceiver 912 is configured to transmit and receive signals for the communications device 900 via an antenna 920, such as the various signals described herein. The processing system 914 may be configured to perform processing functions for the communications device 900, including processing signals received and/or to be transmitted by the communications device 900.

The processing system 914 includes a processor 909 coupled to a computer-readable medium/memory 910 via a bus 924. In certain aspects, the computer-readable medium/memory 910 is configured to store instructions that when executed by processor 909, cause the processor 909 to perform the operations illustrated in FIG. 8, or other operations for performing the various techniques discussed herein.

In certain aspects, the processing system 914 further includes a communicating component 902 for performing the operations illustrated at 802 in FIG. 8. Additionally, the processing system 914 includes a receiving component 904 for performing the operations illustrated at 804 in FIG. 8. The processing system 914 also includes a selecting component 906 for performing the operations illustrated at 806 in FIG. 8. The processing system 914 further includes a performing component 908 for performing the operations illustrated at 808 in FIG. 8.

The communicating component 902, receiving component 904, selecting component 906, and performing component 908 may be coupled to the processor 909 via bus 924. In certain aspects, the communicating component 902, receiving component 904, selecting component 906, and performing component 908 may be hardware circuits. In certain aspects, the communicating component 902, receiving component 904, selecting component 906, and performing component 908 may be software components that are executed and run on processor 909.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
communicating, by the UE, with a first base station (BS) on a downlink on a first frequency band;
receiving, by the UE from the first BS, a list comprising random access channel (RACH) configuration parameters for each of a plurality of BSs;
selecting a second BS from the plurality of BSs based on an ordering of the plurality of BSs in the list;
performing a RACH procedure with the second BS utilizing the RACH configuration parameters for the second BS to establish communication with the second BS on an uplink on a second frequency band that is different than the first frequency band; and
receiving the list over a spatial beam of a plurality of spatial beams transmitted by the first BS, each of the plurality of spatial beams carrying a different list, wherein the ordering is based on a location of each of the plurality of BSs with respect to the spatial beam.

2. The method of claim 1, wherein the UE receives the list in remaining minimum system information (RMSI).

3. The method of claim 1, wherein the first BS is configured to determine the plurality of BSs to include in the list based on indications of measurements provided by one or more UEs to the first BS of downlink transmissions of the plurality of BSs.

4. The method of claim 3, wherein the first BS is configured to determine the ordering based on the indications of measurements provided by the one or more UEs to the first BS of the downlink transmissions of the plurality of BSs.

5. The method of claim 3, further comprising:
receiving, from the first BS, an indication of one or more frequency bands that are different than the first frequency band and the second frequency band for measuring the downlink transmissions of the plurality of BSs.

6. The method of claim 5, wherein the indications of measurements are adjusted based on differences between the one or more frequency bands and the second frequency band.

7. The method of claim 3, further comprising:
receiving, from the first BS, an indication of one or radio access technologies (RATs) for measuring the downlink transmissions of the plurality of BSs.

8. The method of claim 1, further comprising:
measuring downlink transmissions from each of the plurality of BSs; and
determining the ordering of the plurality of BSs based on the measured downlink transmissions.

9. The method of claim 8, further comprising receiving from the first BS an indication of transmit powers associated with each of the plurality of BSs, wherein determining the ordering is further based on the transmit powers associated with each of the plurality of BSs.

10. The method of claim 1, further comprising:
determining, for each of the plurality of BSs, a RACH procedure success rate; and
determining the ordering of the plurality of BSs based on the RACH procedure success rates.

11. The method of claim 1, wherein the ordering of the plurality of BSs is based on a location of the UE.

12. The method of claim 1, further comprising:
detecting, by the UE, downlink transmissions from one or more additional base stations on the first frequency band; and
transmitting to the first BS information indicating the detected one or more additional base stations, wherein the ordering of the plurality of BSs is determined by the first BS based on a location of each of the plurality of BSs with respect to the one or more additional base stations.

13. A user equipment (UE) comprising:
a memory; and
a processor coupled to the memory, the processor being configured to:
communicate with a first base station (BS) on a downlink on a first frequency band;

receive, from the first BS, a list comprising random access channel (RACH) configuration parameters for each of a plurality of BSs;

select a second BS from the plurality of BSs based on an ordering of the plurality of BSs in the list;

perform a RACH procedure with the second BS utilizing the RACH configuration parameters for the second BS to establish communication with the second BS on an uplink on a second frequency band that is different than the first frequency band; and receive the list over a spatial beam of a plurality of spatial beams transmitted by the first BS, each of the plurality of spatial beams carrying a different list, wherein the ordering is based on a location of each of the plurality of BSs with respect to the spatial beam.

14. The UE of claim 13, wherein the UE receives the list in remaining minimum system information (RMSI).

15. The UE of claim 13, wherein the first BS is configured to determine the plurality of BSs to include in the list based on indications of measurements provided by one or more UEs to the first BS of downlink transmissions of the plurality of BSs.

16. The UE of claim 15, wherein the first BS is configured to determine the ordering based on the indications of measurements provided by the one or more UEs to the first BS of the downlink transmissions of the plurality of BSs.

17. The UE of claim 15, wherein the processor is further configured to:

receive, from the first BS, an indication of one or more frequency bands that are different than the first frequency band and the second frequency band for measuring the downlink transmissions of the plurality of BSs.

18. The UE of claim 17, wherein the indications of measurements are adjusted based on differences between the one or more frequency bands and the second frequency band.

19. The UE of claim 15, wherein the processor is further configured to:

receive, from the first BS, an indication of one or radio access technologies (RATs) for measuring the downlink transmissions of the plurality of BSs.

20. The UE of claim 13, wherein the processor is further configured to:

measure downlink transmissions from each of the plurality of BSs; and determine the ordering of the plurality of BSs based on the measured downlink transmissions.

21. The UE of claim 20, wherein the processor is further configured to receive from the first BS an indication of transmit powers associated with each of the plurality of BSs, wherein to determine the ordering is further based on the transmit powers associated with each of the plurality of BSs.

22. The UE of claim 13, wherein the processor is further configured to:

determine, for each of the plurality of BSs, a RACH procedure success rate; and determine the ordering of the plurality of BSs based on the RACH procedure success rates.

23. The UE of claim 13, wherein the ordering of the plurality of BSs is based on a location of the UE.

24. The UE of claim 13, wherein the processor is further configured to:

detect downlink transmissions from one or more additional base stations on the first frequency band; and transmit to the first BS information indicating the detected one or more additional base stations, wherein the ordering of the plurality of BSs is determined by the first BS based on a location of each of the plurality of BSs with respect to the one or more additional base stations.

25. A user equipment (UE) comprising:

means for communicating with a first base station (BS) on a downlink on a first frequency band;

means for receiving, from the first BS, a list comprising random access channel (RACH) configuration parameters for each of a plurality of BSs;

means for selecting a second BS from the plurality of BSs based on an ordering of the plurality of BSs in the list;

means for performing a RACH procedure with the second BS utilizing the RACH configuration parameters for the second BS to establish communication with the second BS on an uplink on a second frequency band that is different than the first frequency band;

means for receiving the list over a spatial beam of a plurality of spatial beams transmitted by the first BS, each of the plurality of spatial beams carrying a different list, wherein the ordering is based on a location of each of the plurality of BSs with respect to the spatial beam.

26. The user equipment of claim 25, wherein the UE receives the list in remaining minimum system information (RMSI).

27. A non-transitory computer readable storage medium that stores instructions that when executed by a user equipment (UE) causes the UE to perform a method for wireless communication, the method comprising:

communicating, by the UE, with a first base station (BS) on a downlink on a first frequency band;

receiving, by the UE from the first BS, a list comprising random access channel (RACH) configuration parameters for each of a plurality of BSs;

selecting a second BS from the plurality of BSs based on an ordering of the plurality of BSs in the list;

performing a RACH procedure with the second BS utilizing the RACH configuration parameters for the second BS to establish communication with the second BS on an uplink on a second frequency band that is different than the first frequency band; and receiving the list over a spatial beam of a plurality of spatial beams transmitted by the first BS, each of the plurality of spatial beams carrying a different list, wherein the ordering is based on a location of each of the plurality of BSs with respect to the spatial beam.

28. The non-transitory computer readable storage medium of claim 27, wherein the UE receives the list in remaining minimum system information (RMSI).

* * * * *